(United States Patent Office — 3,344,205 — Patented Sept. 26, 1967)

3,344,205
LOW VISCOSITY RUBBER-STYRENE INTERPO-
LYMERIZABLE COMPOSITIONS AND THEIR
PREPARATION
Alan E. Grey, San Pedro, and Louis B. Banasky, Los
Alamitos, Calif., assignors to Shell Oil Company, New
York, N.Y., a corporation of Delaware
No Drawing. Filed Feb. 10, 1964, Ser. No. 343,504
8 Claims. (Cl. 260—880)

ABSTRACT OF THE DISCLOSURE

The time required for dissolving rubber in styrene, and the viscosity of the resulting solution, are both reduced by forming the solutions in the presence of alkylphenoxy polyethoxy ethanol.

This invention relates to new interpolymerizable compositions. More particularly, it is concerned with the preparation of low viscosity solutions of rubbers and vinyl arene monomers.

Methods for the preparation of synthetic rubbers may be generally referred to as solution or emulsion processes. In the latter case, the monomers are polymerized (including copolymerized) in the presence of water to yield a latex which is then treated with salt and/or acid to coagulate and isolate the rubber, after which water is separated therefrom and the coagulated rubber is subjected to drying procedures. Due to the oxidation sensitivity of most rubbers, it is highly desirable to incorporate an oxidation inhibitor as soon as possible in the elastomer to protect it during the drying period which normally requires elevated temperatures for extended times. It is convenient to add stabilizers to elastomers when they are in cement or latex form such as are obtained in the usual processes. However, the incorporation of inhibitors in latex has been a problem which has not been satisfactorily solved up to the present time. While it would be desirable to add the inhibitor in emulsion form to the latex, prior to isolation of the rubber, this has been unsatisfactory since the inhibitors are normally powders or finely divided crystals which disperse unevenly throughout the emulsion and therefore cannot be accurately metered into the latex prior to isolation of the rubber from the aqueous phase.

Among the various uses of elastomers, is that of interpolymerization with vinyl arenes such as styrene to produce so-called high impact polystyrene. In such processes, the general procedure is to incorporate a pre-formed elastomer, such as styrene-butadiene rubber or polybutadiene, in styrene monomer to form a solution which is then subjected to bulk polymerization, possibly with the addition of further proportions of styrene monomer. However, the high molecular weight rubbers utilized for this purpose create a viscosity problem in that the styrene solutions of the rubber are highly viscous and have the nature of a rubber cement. This consequently requires high powered stirring equipment, especially in the initial phases of bulk polymerizatiion processes.

While a number of polar compounds such as monomeric alcohols and the like may be added to hydrocarbon solutions of rubbers to reduce their viscosity, these are highly undesirable in interpolymerization of styrene since they interfere not only with the interpolymerization process but also degrade the products eventually obtained therefrom. Many of them for example, are difficult or impossible to remove subsequent to the polymerization step and consequently remain as contaminating components in the final product.

It is an object of the present invention to improve the process for stabilizing elastomer compositions. It is a particular object of the invention to improve the accuracy of dispersion of antioxidants in elastomer latices. It is a separate object of the invention to improve the process for the interpolymerization of elastomers with vinyl arenes. It is a special object of the invention to provide an improved interpolymerization process wherein the rubber utilized in such process forms a solution in the monomer having relatively low viscosity, either with or without the presence of an oxidation inhibitor. Other objects will become apparent during the following detailed description of the invention.

Now, in accordance with the present invention, it has been found that an especially effective and accurate way of dispersing elastomer antioxidants throughout an elastomer latex is to first emulsify the antioxidant (which is essentially water-insoluble) in water by means of a minor proportion of an alkyl phenoxy polyethoxy ethanol; adding the emulsion so formed to an elastomer latex; coagulating and separating the rubber from the latex and subjecting it to drying; and thereafter dispersing the recovered elastomer in monomeric vinyl arenes. It has been discovered that a residual amount at least of the alkyl phenoxy polyethoxy ethanol (hereinafter called ethoxy ethanol) remains with the rubber and is dispersed together therewith in the vinyl arene monomer. It has also been found that the ethoxy ethanol causes a dramatic reduction in the viscosity of the resulting solution and thereby creates a composition which is interpolymerizable to form high impact polymers without the disadvantage of having to cope with high viscosity solutions as heretofore found to be necessary.

Still in accordance with the present invention, it has been found possible to incorporate the polyethoxy ethanol in styrene and add thereto an elastomer, achieving the same viscosity-reducing phenomenon experienced if the ethoxy ethanol had been added to the elastomer latex during manufacture of the latter. In fact, the addition of polyethoxy ethanol is beneficial enough in viscosity reduction of the monomer solution of the elastomer to be utilized in the absence of any antioxidant if such is a desirable procedure to follow, e.g., if the elastomer is not especially subject to degradation by oxidation. Of course, the polyethoxy ethanol can be added to the rubber latex even in the absence of antioxidant if the rubber is one not especially prone to oxidation.

Following the addition of an elastomer to vinyl arene monomer in the presence of the polyethoxy ethanol, the composition, now comprising an interpolymerizable mixture, is subjected to polymerization procedures, such as bulk polymerization. This may be effected in the presence or absence of substantially inert diluents such as toluene and the like and may be continuous or batch processes according to the details in this respect which are desired.

The alkyl phenoxy polyethoxy ethanols are non-ionic surfactants having the general formula

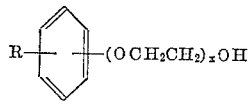

wherein $x$ is an integer from about 3 to about 30, preferably from about 5 to about 20; and R is an alkyl group having from 4 to 18 carbon atoms, preferably 6–12 carbon atoms. Normally, these products, being articles of commercial manufacture, are mixtures of varying polyoxy ethylene chain lengths distributed according to the Poisson distribution. Hence, the average chain length referred to above may include minor amounts of shorter or longer chains than those specified. Usually, the alkyl groups will be predominantly 8 or 9 carbon atoms, but a restricted range either side of these figures will usually occur.

In the preferred form of the invention, the antioxidant is emulsified by means of the above-described polyethoxy ethanols in water to form an emulsion. It is immaterial which phase, i.e., the antioxidant or the water forms the exterior phase of the emulsion, but normally sufficient water is employed that the latter is the exterior phase. The proportion of ethoxy ethanol required for emulsification is readily determined with each antioxidant, but will normally be between about 1 and 25% based on the weight of the antioxidant. The proportion of water emulsified therewith is not of paramount importance, but will be sufficient to create a reasonably stable and fluid emulsion for later use. Usually, the proportion of water will be between about 2 and about 10 parts by weight for each part by weight of the antioxidant.

The rubber antioxidants dispersed in this manner may be any of those commercially employed for rubber oxidation inhibition. While arene alkyl phosphites are preferred for this purpose, many other types of antioxidants may be used in addition to or in place of the phosphites.

The preferred arene phosphites are exemplified by the following:

Trinonylphenyl phosphite
Triphenyl phosphite
Tri-o-tolyl phosphite
Tri-m-tolyl phosphite
Tri-p-tolyl phosphite
Tri-xenyl phosphite
Tri-beta-naphthyl phosphite
Tri-alpha-naphthyl phosphite
Tri(p-isopropyl phenyl) phosphite
Tri(p-tertiary butyl phenyl) phosphite
Tri(p-tertiary amyl phenyl) phosphite
Tri(p-phenoxy phenyl) phosphite
Tri(p-benzyloxy phenyl) phosphite
Tri(p-chlorophenyl) phosphite
Tri(4-methyl 2,6-di-tertiary butyl phenyl) phosphite
Tri(3-methyl-4,6-di-tertiary butyl phenyl) phosphite
Tri(3,5-dimethyl phenyl) phosphite
Tri(2,4-dimethyl phenyl) phosphite
Tri(3,4-dimethyl phenyl) phosphite
Tri(2,5-dimethyl phenyl) phosphite
Tri(2,4,6-tri-tertiary butyl phenyl) phosphite
Tri(2-methyl-4,6-di-tertiary butyl phenyl) phosphite Arene amines, quinones, quinolines and alkyl phenols may be employed in addition to or in place of the phosphites. The following are typical species of these classes:

Arene amines: phenyl-alpha-naphthylamine, phenyl-beta-naphthylamine, diphenyl amine, heptyldiphenyl amine.
Quinones and quinolines: di-tert-butyl hydroquinone, 2,2,4-trimethyl-6-phenyl-1,2-dihydroquinoline.
Phenols: 2,4,4-trialkyl phenols, 2,4-dimethyl-6-octyl phenol, 2,4-dimethyl-6-isobornyl phenol, 2,6-di-tert-butyl-4-methyl phenol.

Having prepared the emulsion of stabilizer by use of the ethoxy ethanol emulsifier and water, it is then added to a latex of an elastomer. The precise identity of the elastomer is not important here, but normally will be an elastomer wherein at least 10% of the monomers utilized in its preparation are conjugated dienes. Typical elastomers of this kind are polyisoprene polybutadiene, and particularly, the family of styrene-butadiene (SBR) elastomers. Of the latter type, any proportion of styrene and butadiene which will yield an elastomeric product is contemplated here. However, where the elastomer is to be employed in the preparation of high impact polystyrene, SBR elastomers should have from 20 to 60% of bound styrene, preferably 22–50% by weight.

One of the species of rubbers which may be advantageously employed for the production of high impact vinylarene interpolymers is generically referred to as a block copolymer. Block polymers may have only two blocks, such as polystyrene-polyisoprene or polystyrene-polybutadiene; or, more preferably, are multi-block polymers typified by those having three polymer blocks, the center block being an elastomeric polymer block and the two terminal blocks being plastic blocks. Of these, the typical ones include, polystyrene-polyisoprene-polystyrene or polystyrene-polybutadiene-polystyrene. These block polymers may be employed as the sole rubber or in conjunction with other rubbers such as polybutadiene or styrene-butadiene random copolymers. The block polymers have the additional advantage when employed in a multistage polymerization process of permitting a further degree of "prepolymerization" in the first stage without damage to the eventual properties of the finished product than is possible when utilizing ordinary rubbers in a similar bulk polymerization process.

The proportion of antioxidant to be added to the latex will depend largely upon the identity of the antioxidant and of the elastomer. Normally the amount employed will be between about 0.1 and 3% by weight of the elastomer, usually between about 0.5 and 1.5%. The proportion of ethoxy ethanol added together with the antioxidant in the form of the emulsion will usually be between about 0.005 and 1%, preferably 0.01 and 0.25%.

Following dispersion of the emulsion of stabilizer and ethoxy ethanol in the elastomer latex, the rubber contained in the latex is isolated from the water phase. The specific steps required for this are known in the art, such as creaming with salt followed by coagulation with acid and drying of the polymer so isolated.

One of the surprising features of the present invention in this respect is the retention of a substantial proportion of the ethoxy ethanol within the polymer in spite of the fact that the ethoxy ethanol is actually water soluble. It appears that it is strongly absorbed by the rubber or at least sufficiently so that a substantial portion of it is retained therein.

While the process described so far exhibits a substantial advantage for the use of the ethoxy ethanol in dispersing the antioxidant in its emulsion and throughout the elastomer latex, its major importance resides in the eventual use of the rubber, as will now be described:

In interpolymerizing an elastomer with a vinyl arene such as styrene or its isomers, the usual procedure is to dissolve the rubber in monomeric styrene and thereafter interpolymerize the mixture either thermally or by the aid of known initiators or polymerization catalysts. One of the difficulties encountered has been first the slow rate of solution of the rubber in monomeric styrene and, secondly, the high viscosity of the solution when it is eventually obtained. The use of the present invention minimizes both of these aspects. Surprisingly enough, the small amount of ethoxy ethanol retained by the rubber enables substantially greater rates of solution of the rubber in monomeric vinyl arenes and also results in the formation of solutions having substantially lower viscosity than if the ethoxy ethanol is absent.

The amount of ethoxy ethanol required for this purpose is surprisingly small, in the order of between about 0.005 and 1% based on the monomer. If the preceding steps had been such that too little ethoxy ethanol is incoporated in the rubber being added to the monomeric styrene, it is of course possible to add supplemental proportions of the ethoxy ethanol. The effect of concentration of the polyethoxy ethanol upon the viscosity of a typical solution of styrene-butadiene rubber in monomeric styrene is shown in the following table:

*Viscosity of 5% solutions of SBR in styrene*

| Percent ethoxy ethanol: | Viscosity, cps. |
|---|---|
| 0 | 137 |
| 0.0015 | 132 |
| 0.03 | 79 |
| 1.10 | 77 |

The presence of the ethoxy ethanol exerts a speed-up effect on solution time of rubber in vinyl arene. For example, the rate of solution of SBR in styrene is virtually doubled. Thus, it is advantageous to incorporate a polyethoxy ethanol in an interpolymerization mixture, both with respect to the rate of solution of rubber and the viscosity of the resulting solution of rubber in the monomer. These advantages are in addition to the advantages previously experienced as described earlier in this description relative to the use of the polyethoxy ethanol in the dispersion of stabilizers in emulsion form for incorporation in a rubber latex.

High impact interpolymerization is a process known in the art of polystyrene manufacture. The proportion of rubber necessary for incorporation in such products also is known but usually will vary from 1–30%, usually 5–15% based on the entire interpolymer.

The advantages gained relative to speed of solution and viscosity of rubber in styrene would only be commercially acceptable if the polyethoxy ethanol present did not cause any unwelcome change in the properties of the product. Tests have shown on a commercial scale that the presence of polyethoxy ethanol causes no disadvantageous change in the physical properties of high impact polystyrene and, in fact, results in certain modest improvements in some properties.

The type of process contemplated particularly in the use of the present invention can be generically referred to as bulk polymerization of vinyl arenes, especially of styrene. Multi-stage processes are especially favored in this respect, the first stage of such processes usually being called prepolymerization. In this prepolymerization stage, the mixture of vinyl arene monomer is preferably stirred slowly until a limited amount of polymerization has occurred and then moves to a second polymerization stage, comprising normally a vertical tower in which the polymerization mass moves from top to bottom. The tower consists of several zones or sections, each of which contains heat controlling means.

It is preferred to carry the prepolymerization stage as far as possible before transferring the polymerization mass to the second stage. This is found to be critical in some interpolymerization with particular elastomers, when high impact polystyrene interpolymers are being produced. The desirability of carrying prepolymerization to an optimum extent lies not only in the eventual products of the fully polymerized material but also in the heat removal requirement in the second stage reactor. Since the polymerization is exothermic at this stage, it is necessary to control temperature either by reflux cooling of monomer or minor amounts of added inert solvents such as toluene or by heat transfer.

While the interpolymerization process may be carried out in a batch manner, it is preferred to conduct a continuous process introducing a solution of the elastomer in styrene monomer. The rate of introduction is such as to keep the vessel full of liquid or to maintain a constant liquid level. The prepolymerization vessel can be at atmospheric pressure or operated under small positive pressure to prevent contamination of products with lubricants or other materials which may be extracted from the stuffing glands of the stirrer. Inert gas may be bled through the stuffing glands to prevent contamination as well.

The polymerization temperature of the liquid in the pre-polymerizer is maintained generally within a range between about 80 and 125° C., usually by withdrawing heat from or supplying heat to the liquid body through the walls of the vessel or by a suitable heat exchanger within the body of the liquid. The total contents of the prepolymerizer are slowly stirred by means of a suitable stirrer such as a paddle. The rate of passage of the interpolymerizing mixture through the prepolymerization vessel is controlled to effect a fixed amount of polymerization between about 25 and 40% of the introduced monomer. Residence time in the prepolymerizer is generally from 8 to 20 hours, catalysts usually being unnecessary but if present, causing an accelerated reaction rate.

The partially polymerized liquid leaves the prepolymerizer by gravity or under slight applied pressure or by pumping and passes through to the polymerization tower. The temperatures in the polymerization tower may vary from about 100 to 150° C., the polymerizing mass passing slowly down the length of the tower and leaving the bottom of the reactor at such a rate that no more than about 10% of unpolymerized styrene remains.

Solvent processes are contemplated as well as the preferred bulk polymerization processes. By "solvent" process is meant a process in which solvent forms a major component of the reaction mixture as opposed to the absence or presence only to a minor extent of solvent in the bulk polymerization process.

The following example illustrates the process of the present invention: An emulsion of an elastomer stabilizer, namely, tris(nonyl phenyl)phosphite was prepared by emulsifying 90 parts of the phosphite in 480 parts of water with 10 parts by weight of octyl phenoxy decaethoxy ethanol. This emulsion of the antioxidant was added to a latex of a styrene-butadiene elastomer, said latex containing 25 parts of elastomer per 100 parts of latex. The stabilizer was added in an amount of 1.2 phr (parts by weight per hundred parts of elastomer), thus introducing 0.1 phr of the polyethoxy ethanol. The stabilizer was quickly dispersed through the latex with stirring, after which the latex was creamed with salt and coagulated with acid according to the usual procedures, the coagulated rubber then being dried in a tunnel drier. The styrene-butadiene rubber employed for this purpose had 22–24% by weight of bound styrene and had a raw Mooney viscosity of 48.5–49.5.

The recovered rubber containing stabilizer and residual amounts of the polyethoxy ethanol was dissolved in monomeric styrene to form a solution containing 2–12% by weight of the rubber. One of the advantages gained by the presence of the polyethoxy ethanol was the shorter solution time required for this step. On an average, about 3 hours was required to completely dissolve the rubber in monomeric styrene when polyethoxy ethanol was present, but an average of about 5 hours were required for complete solution of the rubber in the absence of polyethoxy ethanol. Moreover, the viscosity of the resulting solution was substantially lower in the presence of the latter additive than when it was omitted, in accordance with the table given hereinbefore in the specification.

The solution so prepared was subjected to polymerizing conditions which include slow stirring in a prepolymerizer reactor at about 100° C. for a reaction time of approximately 3–12 hours with slow stirring. The interpolymerization mass was then passed to a tower reactor where the temperature was raised to about 145° C. and thereafter to about 180° C. for a total polymerization time in the tower reactor of about 4–20 hours. The polymerization product was then withdrawn from the reactor and converted into the usual nibs.

The product indicated on visual inspection that there was no degradation in gloss due to the presence of the polyethoxy ethanol and that the infrared heat stability of the product was somewhat superior to corresponding products containing no polyethoxy ethanol. Moreover, the yellowing factors calculated after 100 hours exposure in a fadometer showed that the interpolymer containing polyethoxy ethanol was somewhat superior in stability in this respect, to the corresponding sample containing none of the ethoxy ethanol.

We claim as our invention:

1. In a method of interpolymerizing 99 to 70 parts by weight of a vinyl arene and 1 to 30 parts by weight of a diene-based elastomer, the steps of dispersing said elastomer vinyl arene together with 0.005–1% based on said monomer of an alkylphenoxy polyethoxy ethanol and thereafter interpolymerizing the vinyl arene and elastomer, said polyethoxy ethanol having the general formula

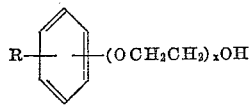

wherein $x$ is an integer from 3 to 30 and R is an alkyl group having 4–18 carbon atoms.

2. In a method of interpolymerizing 99 to 70 parts by weight of styrene with 1 to 30 parts by weight of a styrene-butadiene elastomer, the steps comprising dissolving the elastomer in styrene together with 0.01–0.25% based on styrene of an octyl phenoxy decaethoxy ethanol and thereafter interpolymerizing the styrene and elastomer.

3. The process for the preparation of an interpolymerizable composition which comprises
  (1) emulsifying a rubber-dispersable antioxidant in water with 1–25% based on the antioxidant of an alkyl phenoxy polyethoxy ethanol dispersant having the general formula

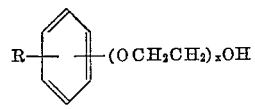

wherein $x$ is an integer from 3 to 30 and R is an alkyl group having 4–18 carbon atoms
  (2) incorporating the emulsion in a latex of an elastomer in an amount sufficient to provide 0.1–3 phr antioxidant
  (3) coagulating the latex whereby the elastomer containing a substantial proportion of the dispersant is isolated;
  (4) and dissolving the elastomer and dispersant in a monomeric vinyl arene whereby an oxidation-stable solution of elastomer in monomer is formed, said solution having a substantially lower viscosity than if the dispersant is omitted.

4. A process according to claim 3 wherein the solution formed in step (4) is subjected to an interpolymerization of the monomer and elastomer contained therein.

5. A process according to claim 3 wherein additional vinyl arene monomer is blended with the solution and interpolymerized with the elastomer.

6. In the preparation of an oxidation-stabilized elastomer solution, the steps of
  (1) emulsifying a styrene-butadiene antioxidant in water in the presence of an alkyl phenoxy polyethoxy ethanol, said polyethoxy ethanol having the general formula

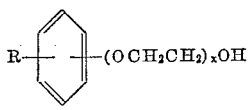

wherein $x$ is an integer from 3 to 30 and R is an alkyl group having 4–18 carbon atoms.
  (2) adding the emulsion so formed to a styrene-butadiene elastomer latex in an amount sufficient to provide substantial stabilization of the elastomer against oxidation and to provide an ethoxy ethanol concentration between about 0.01 and 0.25 phr,
  (3) coagulating, isolating and drying the elastomer whereby a substantial proportion of the ethoxy ethanol is retained, a stabilized elastomer composition;
  (4) and dissolving the composition in styrene whereby a polymerizable solution containing 1–30% by weight of elastomer and at least about 0.005 by weight based on styrene of the ethoxy ethanol is formed, said solution having a viscosity substantially lower than if the ethoxy ethanol is absent.

7. A polymerizable composition comprising
  (1) 99–70 parts by weight of a vinyl arene monomer
  (2) 1–30 parts by weight of an elastomer interpolymerizable therewith
  (3) 0.005–1% by weight of an alkyl phenoxy polyethoxy ethanol, said polyethoxy ethanol having the general formula

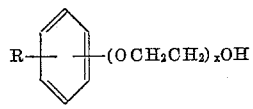

wherein $x$ is an integer from 3 to 30 and R is an alkyl group having 4–18 carbon atoms.

8. A composition according to claim 7 comprising in addition an oxidation inhibiting proportion of an oxidation inhibitor for said elastomer.

References Cited

UNITED STATES PATENTS 2,943,075 6/1960 Schweitzer _____ 260—33.6
3,244,661 4/1966 Kline _____ 260—33.6

OTHER REFERENCES

Schwartz et al., "Surface Active Agents," Interscience Publishers, Inc., 1949, pages 202 and 203.

MORRIS LIEBMAN, *Primary Examiner.*

ALLAN LIEBERMAN, *Examiner.*